(12) United States Patent
Hsu et al.

(10) Patent No.: US 10,824,561 B2
(45) Date of Patent: Nov. 3, 2020

(54) COMPUTER DEVICE AND DATA PROTECTION METHOD THEREFOR

(71) Applicants: Hsiu-En Hsu, Taipei (TW); Chung-Chieh Lee, Taipei (TW); Jeng-Nan Lin, Taipei (TW); Chan-Ju Lin, Taipei (TW); Pa-I Chuang, Taipei (TW); Yu-Ting Chou, Taipei (TW)

(72) Inventors: Hsiu-En Hsu, Taipei (TW); Chung-Chieh Lee, Taipei (TW); Jeng-Nan Lin, Taipei (TW); Chan-Ju Lin, Taipei (TW); Pa-I Chuang, Taipei (TW); Yu-Ting Chou, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 138 days.

(21) Appl. No.: 15/952,264

(22) Filed: Apr. 13, 2018

(65) Prior Publication Data

US 2018/0300239 A1    Oct. 18, 2018

Related U.S. Application Data

(60) Provisional application No. 62/485,389, filed on Apr. 14, 2017.

(51) Int. Cl.
*G06F 11/00* (2006.01)
*G06F 12/0804* (2016.01)
(Continued)

(52) U.S. Cl.
CPC ............ *G06F 12/0804* (2013.01); *G06F 1/28* (2013.01); *G06F 1/30* (2013.01); *G06F 3/068* (2013.01);
(Continued)

(58) Field of Classification Search
CPC ............ G06F 11/3058; G06F 11/1471; G06F 11/0772; G06F 11/3062
See application file for complete search history.

(56) References Cited

U.S. PATENT DOCUMENTS

| | | | |
|---|---|---|---|
| 2005/0050242 A1* | 3/2005 | Chen | G06F 1/26 710/33 |
| 2011/0058440 A1* | 3/2011 | Smith | G11C 5/141 365/229 |

(Continued)

FOREIGN PATENT DOCUMENTS

| | | |
|---|---|---|
| TW | 200839498 | 10/2008 |
| TW | I437419 | 5/2014 |

OTHER PUBLICATIONS

"Office Action of Taiwan Counterpart Application," dated Oct. 16, 2019, p. 1-p. 9.

*Primary Examiner* — Charles Ehne
(74) *Attorney, Agent, or Firm* — JCIPRNET

(57) ABSTRACT

A computer device and a data protection method therefor are provided. The computer device includes an embedded controller, a data storage, and a power module. The embedded controller includes a general-purpose input-output port. The data storage is coupled to the embedded controller through the general-purpose input-output port. The power module is coupled to the embedded controller. The embedded controller detects whether an abnormal shutdown event occurs. When the abnormal shutdown event occurs, the embedded controller informs the data storage to perform a buffered data storage operation through the general-purpose input-output port, so as to transfer buffered data in the data storage to a non-volatile storage area in the data storage, and the embedded controller controls the power module to maintain power supply to the data storage in a predetermined time period.

8 Claims, 2 Drawing Sheets

(51) Int. Cl.
    *G06F 1/30*          (2006.01)
    *G06F 3/06*          (2006.01)
    *G06F 11/07*         (2006.01)
    *G06F 12/02*         (2006.01)
    *G06F 1/28*          (2006.01)
    *G06F 11/30*         (2006.01)

(52) U.S. Cl.
    CPC .......... *G06F 3/0619* (2013.01); *G06F 3/0647* (2013.01); *G06F 11/073* (2013.01); *G06F 11/0751* (2013.01); *G06F 11/0772* (2013.01); *G06F 11/0793* (2013.01); *G06F 11/3058* (2013.01); *G06F 12/0246* (2013.01); *G06F 2212/1032* (2013.01); *G06F 2212/7203* (2013.01)

(56) References Cited

U.S. PATENT DOCUMENTS

| | | | | |
|---|---|---|---|---|
| 2012/0151118 | A1* | 6/2012 | Flynn | G06F 11/1008 |
| | | | | 711/6 |
| 2013/0318335 | A1* | 11/2013 | Wu | G06F 9/442 |
| | | | | 713/2 |
| 2015/0153802 | A1* | 6/2015 | Lucas | G06F 1/30 |
| | | | | 714/22 |

\* cited by examiner

COMPUTER DEVICE AND DATA PROTECTION METHOD THEREFOR

CROSS-REFERENCE TO RELATED APPLICATION

This application claims the priority benefit of U.S. provisional application Ser. No. 62/485,389, filed on Apr. 14, 2017. The entirety of the above-mentioned patent application is hereby incorporated by reference herein and made a part of this specification.

BACKGROUND

Technical Field

The disclosure relates to a computer system. More particularly, the disclosure relates to a computer device and a data protection method therefor for preventing buffered data in a data storage from being lost.

Description of Related Art

Nowadays, most of the consumer electronic devices (e.g., notebook computers, Smartphones, . . . , etc.) are implemented by using computer systems. In this way, functions of the consumer electronic devices may be increased through a variety types of application programs.

Generally, when a computer system operates normally and a user intends to shut down the computer system, the user uses the "shutdown" command in the user interface shut the computer system down. When the computer system is to be shut down through aforesaid manner, not until data access is normally completed by each of the elements itself does the computer system shut down the entire power supply of the computer system. For instance, not until the data writing action performed by the data storage (e.g., the hard disk drive (HDD) or the solid state disk (SSD) in the computer system) is completed does the computer system shut down. Aforesaid shutdown manner is called the "normal shutdown" or the "soft shutdown", and such manner is less likely to affect lifetime of the elements in the computer system.

Another shutdown manner may also be applied in which a user directly presses the power button of the computer system for a predetermined time period. In this way, power in the computer system is directly turned off. The shutdown manner is called the "abnormal shutdown" or the "hard shutdown". When the "abnormal shutdown" occurs, if the data storage is performing data writing during this period, or data being buffered in the data storage is not written into the non-volatile element in the non-volatile storage device (a platter for the hard disk drive; a NAND-type cache memory for the solid state disk), the data may be lost, and the entire read/write block of the data storage may even be crashed and thus may not be used. Therefore, in addition to preventing the "abnormal shutdown" from occurring as much as possible, is there any other method that can be deployed to prevent data loss when the "abnormal shutdown" occurs is an important issue.

SUMMARY

The disclosure provides a computer device and a data protection method therefor which informs a data storage to perform data protection when an abnormal shutdown event occurs, so as to allow buffered data in the data storage to be completely stored to prevent data loss.

In an embodiment of the disclosure, a computer device includes an embedded controller, a data storage, and a power module. The embedded controller includes a general-purpose input-output (GPIO) port. The data storage is coupled to the embedded controller through the general-purpose input-output port. The power module is coupled to the embedded controller. The embedded controller detects whether an abnormal shutdown event occurs. When the abnormal shutdown event occurs, the embedded controller informs the data storage to perform a buffered data storage operation through the general-purpose input-output port, so as to transfer buffered data in the data storage to a non-volatile storage area in the data storage. Moreover, the embedded controller controls the power module to maintain power supply to the data storage in a predetermined time period.

In an embodiment of the disclosure, a data protection method of a computer device is further disclosed. The computer device includes an embedded controller, a data storage, and a power module. The embedded controller is coupled to the data storage through a general-purpose input-output port. The protection method includes the following steps. Whether an abnormal shutdown event occurs is detected by using the embedded controller. When the abnormal shutdown event occurs, the data storage is informed to perform a buffered data storage operation through the general-purpose input-output port by using the embedded controller so as to transfer buffered data in the data storage to a non-volatile storage area in the data storage, and the power module is controlled to maintain power supply to the data storage in a predetermined time period by using the embedded controller.

To sum up, in the embodiments of the disclosure, when the abnormal shutdown event (e.g., when a power button of the computer device is pressed) occurs in the computer device, the embedded controller informs the data storage through the general-purpose input-output port in a hardware manner, so as to enable the data storage to immediately perform a data protection action (e.g., the buffered data storage operation). After the power button is continuously pressed for the predetermined time period (e.g., 4 seconds), even though the computer device is shut down as the power module is forced to stop supplying power, the data protection action performed by the data storage is to be completed within the predetermined time period. In this way, in the computer device provided by the embodiments of the disclosure, the buffered data in the data storage can be completely stored when the abnormal shutdown event occurs, and data loss is thus prevented.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
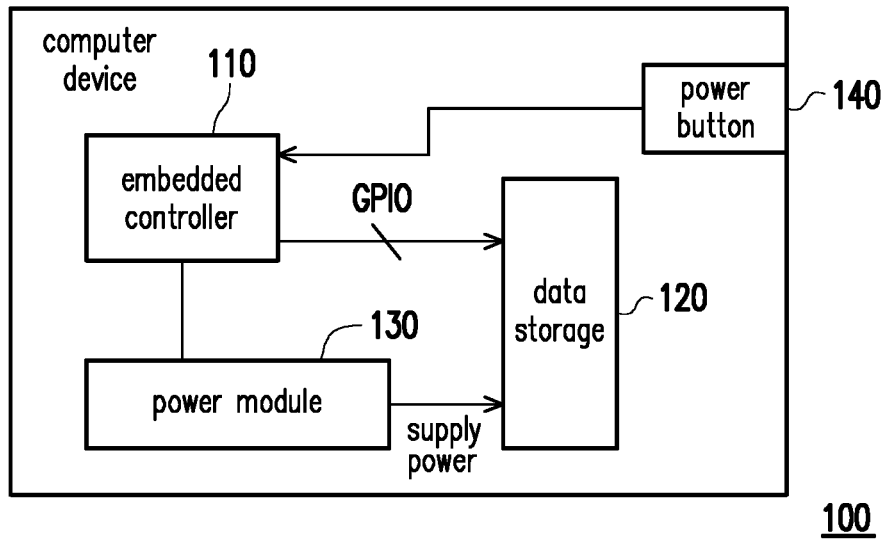
FIG. 1 is a schematic view of a computer device according to an embodiment of the disclosure.

FIG. 1 is a schematic view of a computer device 100 according to an embodiment of the disclosure. The computer device 100 includes an embedded controller 110, a data storage 120, and a power module 130. The computer device 100 may be a notebook computer, a tablet computer, a Smartphone, and the like, and the computer device 100 is exemplified by being a notebook computer in this embodiment. The embedded controller 110 may be coupled to a chipset (not shown) of the computer device 100. The embedded controller 110 of this embodiment not only controls input units such as a keyboard (not shown) of the computer device 100 and controls the power module 130 to manage overall power supply of the computer device 100 but also includes a general-purpose input-output port GPIO coupled to the data storage 120. The data storage 120 may be a hard disk drive (HDD) or a solid state disk (SSD). The power module 130 is coupled to the embedded controller 110. The power module 130 may be a battery, a power supply device transforming alternating current to direct current, or a physical device that powers the computer device 100.

The data storage 120 of this embodiment may include a buffered area and a non-volatile storage area. The buffered area is, for example, implemented as a dynamic random access memory (DRAM) and is configured for temporarily storing buffered data that the data storage 120 is reading and writing. When the data storage 120 is not powered, data in the buffered area is to be lost. That is, the buffered area belongs to a volatile storage element. The non-volatile storage area is, for example, implemented as a disk (corresponding to the hard disk drive) or a NAND-type cache memory (corresponding to the solid state disk). Even though the data storage 120 is not powered, data in the non-volatile storage area is not to be lost. That is, the non-volatile storage area belongs to a non-volatile storage element.

The computer device 100 also includes a power button 140. When a user presses the power button 140, the embedded controller 110 of this embodiment determines that an abnormal shutdown event occurs. Moreover, after the power button 140 is continuously pressed for a predetermined time period (e.g., 4 seconds), the embedded controller 110 controls the power module 130 to stop supplying power to the entire computer device 100 to enable the computer device 100 to shut down. Aforesaid shutdown action is an emergency shutdown action mainly generated when the computer device 100 is required to be shut down immediately owing to occurrence of any abnormal operation, and abnormal data access thus occurs in the data storage. In related embodiments of the disclosure, other methods may also be used to cause the abnormal shutdown event to occur. For instance, a hard shutdown may be remotely performed to the computer device 100 through the network technology, and such method may make the embedded controller 110 determine that the abnormal shutdown event occurs.

Figure 2:
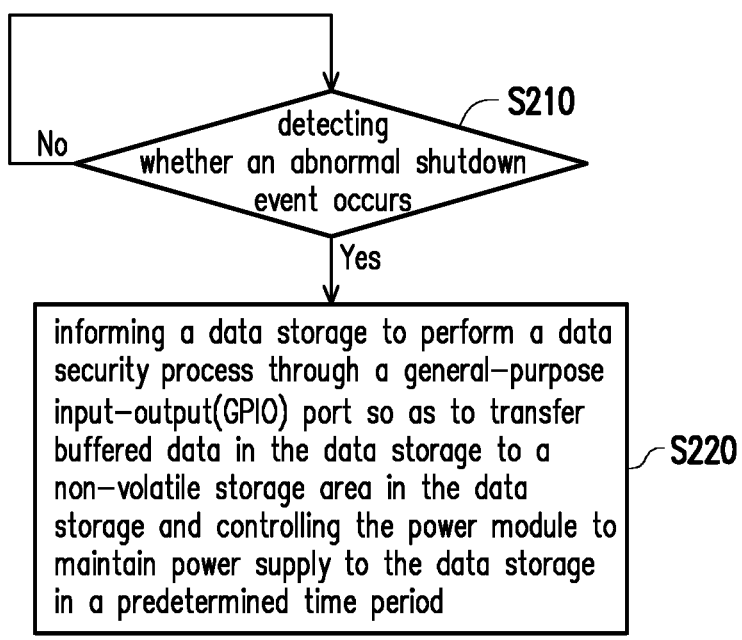
FIG. 2 is a flowchart of a data protection method of a computer device according to a first embodiment of the disclosure.

FIG. 2 is a flowchart of a data protection method of a computer device according to a first embodiment of the disclosure. The data protection method described in FIG. 2 may be applied to the computer device 100 of FIG. 1 to be implemented. In step S210, the embedded controller 110 detects whether the abnormal shutdown event occurs (e.g., the power button 140 is pressed). Step S220 is performed after step S210 when the abnormal shutdown event occurs, and the embedded controller 110 informs the data storage 120 to perform a data security process (e.g., the buffered data storage operation) through the general-purpose input-output port GPIO, so as to transfer the buffered data in the data storage 120 to the non-volatile storage area in the data storage 120. The buffered data storage operation not only transfers the buffered data located in the buffer area in the data storage 120 to the non-volatile storage area in the data storage 120 to complete storage but also flushes the data in the buffered area in the data storage 120. As such, the data in the buffered area is set to be an initial value (the initial value is, for example, logic "0" or logic "1"). Moreover, the embedded controller 110 controls the power module 130 in step S220 to maintain power supply to the data storage 120 in the predetermined time period (e.g., 4 seconds). The embedded controller 110 of this embodiment transmits a specific notification signal to the data storage 120 through the general-purpose input-output port GPIO to perform the buffered data storage operation.

After step S220 is performed, since the data security process of this embodiment is to be completed within the predetermined time period, the buffered data in the data storage 120 may still be completely stored to the non-volatile storage area even a hard shutdown is performed to the computer device 100. In other words, the "predetermined time period" described in this embodiment refers to a preset specific time period in the computer device 100. When the user presses the power button 140 and keeps pressing the power button 140 for the predetermined time period, hardware of the computer device 100 is shut down, and the data security process of the data storage 120 in the embodiment of the disclosure is also completed within the predetermined time period. The "predetermined time period" is, for example, any time period of 4 seconds to 10 seconds and may be set according to requirements from people applying this embodiment and is required to be complied with performance effectiveness of the data security program.

Figure 3:
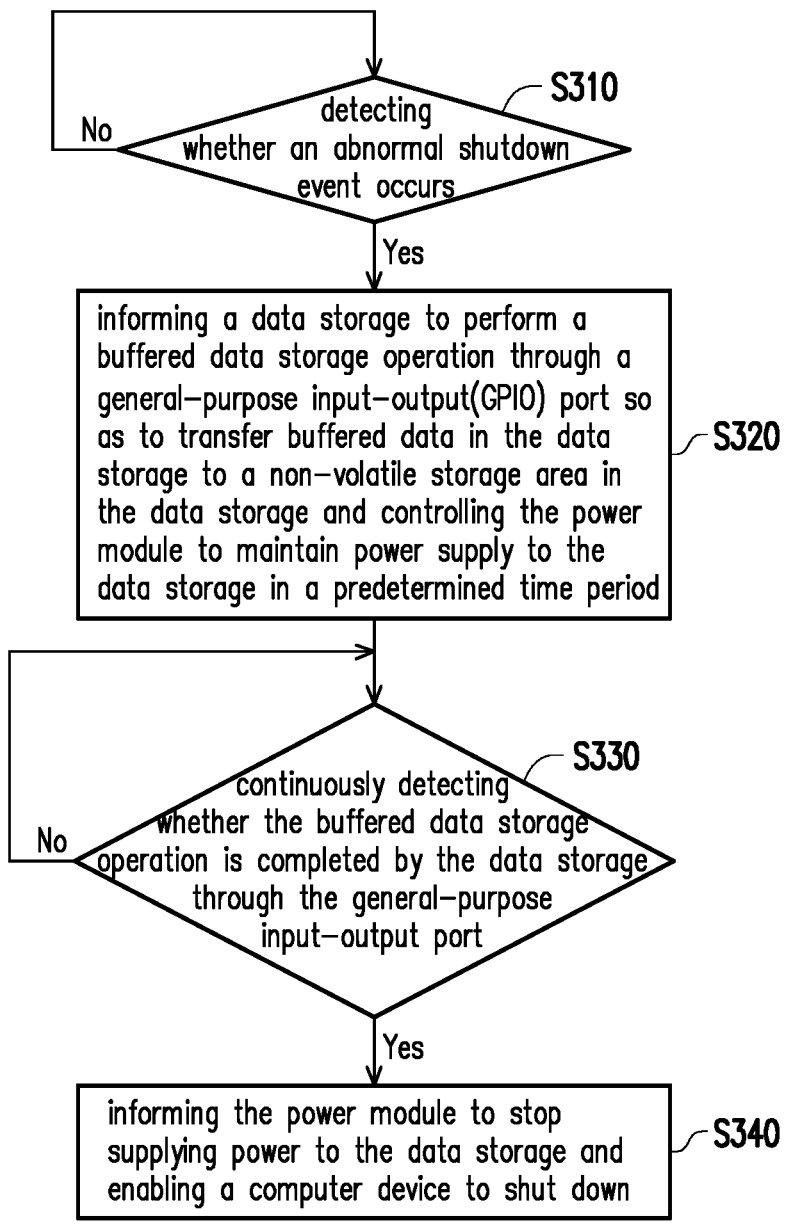
FIG. 3 is a flowchart of a data protection method of a computer device according to a second embodiment of the disclosure.

FIG. 3 is a flowchart of a data protection method of a computer device according to a second embodiment of the disclosure. The data protection method described in FIG. 3 may be applied to the computer device 100 of FIG. 1 to be implemented. Step S310 and step S320 in FIG. 3 are similar to step S210 and step S220 in FIG. 2, and thus description of similar contents can be referred to the foregoing embodiment. A difference between the embodiment of FIG. 3 and the embodiment of FIG. 2 includes that the embedded controller 110 determines whether a feedback signal returned by the data storage 120 after performing buffered data storage operation is obtained in step S330 to step S340 in FIG. 3 and shuts down the computer device 100 after obtaining the feedback signal. To be specific, in step S330, the embedded controller 110 continuously detects whether the data storage 120 completes the buffered data storage operation through the general-purpose input-output port GPIO. Before step S330 is completed, the embedded controller 110 may keep performing step S330 to continuously perform detection. The embedded controller 110 determines whether the data storage 120 returns the feedback signal through the general-purpose input-output port GPIO, so as to learn whether the buffered data storage operation is completed. When the embedded controller 110 learns that the buffered data storage operation is completed through the general-purpose input-output port GPIO, step S340 is performed after step S330, and the embedded controller 110 informs the power module 130 to stop supplying power to the data storage 120 and enables the computer device 100 to shut down.

In some embodiments, a spare capacitor may be additionally installed in the data storage 120 to temporarily store some power. Moreover, when the abnormal shutdown event occurs, the power stored may be used to store the data in the buffered area to the non-volatile storage area. Nevertheless, it is not clear whether the power stored by the spare capacitor is sufficient to allow the data in the buffered area to be completely stored in the non-volatile storage area. Moreover, additional costs are required to install the spare capacitor in the data storage 120. It can thus be seen that since no additional spare capacitor is required to be installed in the data storage 120 for data retention (e.g., the buffered data storage operation) in this embodiment, setup costs are saved.

In view of the foregoing, in the embodiments of the disclosure, when the abnormal shutdown event (e.g., when the power button of the computer device is pressed) occurs in the computer device, the embedded controller informs the data storage through the general-purpose input-output port in a hardware manner, so as to enable the data storage to immediately perform the data protection action (e.g., the buffered data storage operation). After the power button is pressed for the predetermined time period (e.g., 4 seconds), even though the computer device is shut down as the power module is forced to stop supplying power, the data protection action performed by the data storage is to be completed within the predetermined time period. In this way, in the computer device provided by the embodiments of the disclosure, the buffered data in the data storage can be completely stored when the abnormal shutdown event occurs, and data loss is thus prevented. In addition, the data storage may also inform the embedded controller through the general-purpose input-output port after the data protection action is completed. As such, the embedded controller may learn whether the data protection action is completed, so as to control the power module to completely shut down the computer device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A computer device, comprising:
   an embedded controller, comprising a general-purpose input-output port;
   a data storage, coupled to the embedded controller through the general-purpose input-output port; and
   a power module, coupled to the embedded controller,
   wherein the embedded controller detects whether an abnormal shutdown event occurs,
   the embedded controller informs the data storage to perform a buffered data storage operation through the general-purpose input-output port so as to transfer buffered data in the data storage to a non-volatile storage area in the data storage, and the embedded controller controls the power module to maintain power supply to the data storage in a predetermined time period when the abnormal shutdown event occurs,
   the embedded controller continuously detects whether the data storage completes the buffered data storage operation through the general-purpose input-output port, and
   the embedded controller informs the power module to stop supplying power to the data storage and enables the computer device to shut down when the embedded controller learns that the buffered data storage operation is completed through the general-purpose input-output port.

2. The computer device as claimed in claim 1, further comprising:
   a power button, coupled to the embedded controller,
   wherein the abnormal shutdown event occurs when the power button is pressed, and
   the computer device is shut down as the power module stops supplying power when the power button is continuously pressed for the predetermined time period.

3. The computer device as claimed in claim 1, wherein the embedded controller transmits a notification signal to the data storage through the general-purpose input-output port to perform the buffered data storage operation, and
   the embedded controller determines whether the data storage returns a feedback signal through the general-purpose input-output port so as to learn whether the buffered data storage operation is completed,
   wherein the data storage is a hard disk drive (HDD) or a solid state disk (SSD).

4. The computer device as claimed in claim 1, wherein the buffered data storage operation not only transfers the buffered data located in a buffered area in the data storage to the non-volatile storage area in the data storage to complete storage but also flushes data in the buffered area in the data storage.

5. A data protection method of a computer device, wherein the computer device comprises an embedded controller, a data storage, and a power module, the embedded controller is coupled to the data storage through a general-purpose input-output port, and the data protection method comprises:
   detecting whether an abnormal shutdown event occurs by using the embedded controller;
   informing the data storage to perform a buffered data storage operation through the general-purpose input-output port by using the embedded controller so as to transfer buffered data in data storage to a non-volatile storage area in the data storage and controlling the power module to maintain power supply to the data storage in a predetermined time period by using the embedded controller when the abnormal shutdown event occurs,
   continuously detecting whether the data storage completes the buffered data storage operation through the general-purpose input-output port by using the embedded controller; and
   informing the power module to stop supplying power to the data storage and enabling the computer device to shut down by using the embedded controller when learning that the buffered data storage operation is completed.

6. The data protection method as claimed in claim 5, wherein the computer device further comprises:
   a power button, coupled to the embedded controller,
   wherein the abnormal shutdown event occurs when the power button is pressed, and
   the computer device is shut down as the power module stops supplying power when the power button is continuously pressed for the predetermined time period.

7. The data protection method as claimed in claim 5, wherein the embedded controller transmits a notification signal to the data storage through the general-purpose input-output port to perform the buffered data storage operation, and the embedded controller determines whether the data storage returns a feedback signal through the general-purpose input-output port so as to learn whether the buffered data storage operation is completed, wherein the data storage is a hard disk drive or a solid state disk.

8. The data protection method as claimed in claim 5, wherein the buffered data storage operation not only transfers the buffered data located in a buffered area in the data storage to the non-volatile storage area in the data storage to complete storage but also flushes data in the buffered area in the data storage.

* * * * *